(12) United States Patent
Harrison et al.

(10) Patent No.: US 6,917,180 B2
(45) Date of Patent: Jul. 12, 2005

(54) METHODS AND APPARATUS FOR CONTROLLING ELECTRIC VEHICLE BATTERY CHARGER AND MOTOR USING A SINGLE UNITARY CONTROLLER

(75) Inventors: John Springer Harrison, Roanoke, VA (US); Brian Nedward Meyer, Salem, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/447,880

(22) Filed: May 29, 2003

(65) Prior Publication Data

US 2004/0239288 A1 Dec. 2, 2004

(51) Int. Cl.⁷ .................. H01M 10/44; H01M 10/46
(52) U.S. Cl. ............................................. 320/104
(58) Field of Search ............................ 320/103, 104, 320/132, 149

(56) References Cited

U.S. PATENT DOCUMENTS

| | | |
|---|---|---|
| 5,202,617 A | 4/1993 | Nor |
| 5,346,406 A | 9/1994 | Hoffman et al. |
| 5,548,200 A | 8/1996 | Nor et al. |
| 5,565,760 A | 10/1996 | Ball et al. |
| 5,659,240 A | 8/1997 | King |
| 6,087,805 A | 7/2000 | Langston et al. |
| 6,114,833 A | 9/2000 | Langston et al. |

OTHER PUBLICATIONS

Installation Manual for "Allen–Bradley/Rockwell Automation Connector System", p. 6, Rev O, no date.

*Primary Examiner*—Edward H. Tso
(74) *Attorney, Agent, or Firm*—Armstrong Teasdale LLP

(57) ABSTRACT

A method of controlling electrical energy in a battery-powered vehicle wherein the vehicle includes a battery and a traction motor is provided. The method includes electrically coupling an external source of electrical energy to a unitary, integrated traction motor controller/vehicle battery charge controller positioned on-board the vehicle, controlling electrical energy flow to a vehicle battery with the unitary, integrated traction motor controller/vehicle battery charge controller during a charging period, and controlling electrical energy flow to a vehicle traction motor that is operable to propel the vehicle with the unitary, integrated traction motor controller/vehicle battery charge controller during a transport period.

20 Claims, 3 Drawing Sheets

METHODS AND APPARATUS FOR CONTROLLING ELECTRIC VEHICLE BATTERY CHARGER AND MOTOR USING A SINGLE UNITARY CONTROLLER

BACKGROUND OF THE INVENTION

This invention relates generally to electrical vehicles and more particularly to a traction motor and battery charge control system for an electrical vehicle.

Electric vehicles typically include a battery, a braking system, a motor controller, and at least one propulsive traction motor driven by the motor controller. The various components are interconnected using a plurality of wires which may be assembled into a complex bundle, i.e. a wiring harness, installed in the electric vehicle.

In at least one known electric vehicle manufacturing formation process, several assembly steps are used to install the plurality of components and to electrically connect the components. At each assembly step, man-hours are expended to install the components and electrically connect the components in the complex wiring system. Additionally, repairing or replacing individual components can be costly and time consuming to the owner of the vehicle.

BRIEF DESCRIPTION OF THE INVENTION

In one aspect, a method of controlling electrical energy in a battery-powered vehicle wherein the vehicle includes a battery and a traction motor is provided. The method includes electrically coupling an external source of electrical energy to a unitary, integrated traction motor controller/vehicle battery charge controller positioned on-board the vehicle, controlling electrical energy flow to a vehicle battery with the unitary, integrated traction motor controller/vehicle battery charge controller during a charging period, and controlling electrical energy flow to a vehicle traction motor that is operable to propel the vehicle with the unitary, integrated traction motor controller/vehicle battery charge controller during a transport period.

In another aspect, a unitary, integrated traction motor controller/vehicle battery charge controller (OBC) for controlling electrical energy flow in a battery-powered electric vehicle wherein the vehicle includes a traction motor and a battery for supplying electrical energy to the traction motor is provided. The OBC includes a shunt motor controller mounted within an electrical panel, a battery charge controller mounted within the electrical panel, and a microprocessor operable with the shunt motor controller to control the traction motor during a motoring, a braking, and a standing period wherein the microprocessor is operable with the battery charge controller to control a battery charging rate during a charging period.

In yet another aspect, a battery-operated vehicle is provided. The vehicle includes a traction motor, a battery for supplying electrical energy to the motor, a battery charge controller electrically coupled to the battery, an electrical connector electrically coupled to an external battery charger and to at least one of the battery and the battery charge controller during a charging period, and a motor controller electrically coupled to the motor, the motor controller operable to control current flow to the motor, the battery charge controller and the motor controller are mounted in a single enclosure, the battery charge controller and the motor controller are integrated to be controlled by a single microcontroller mounted in the enclosure.

DETAILED DESCRIPTION OF THE INVENTION

Figure 1:
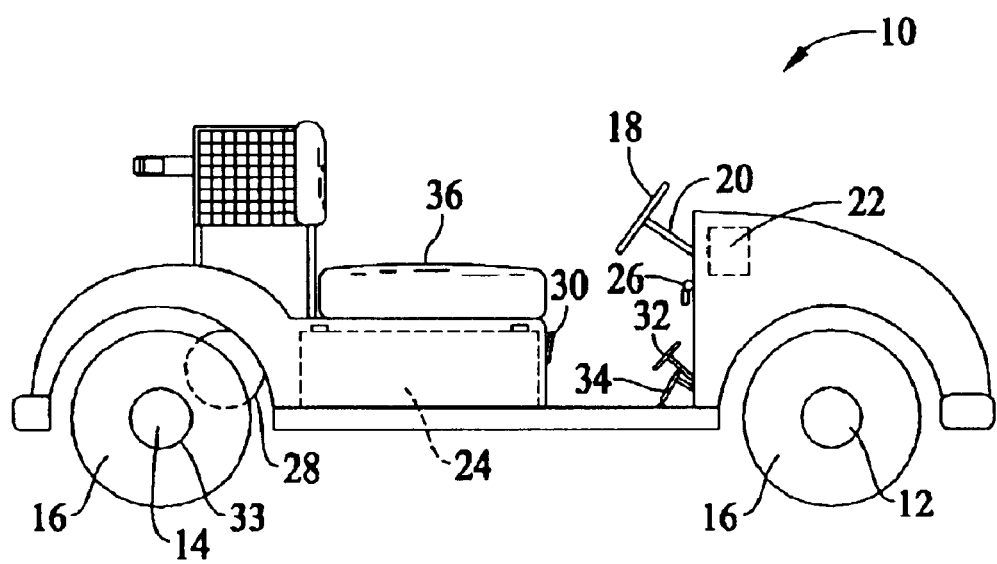
FIG. 1 is a side view of an exemplary electric vehicle.

FIG. 1 is an exemplary illustration of an electric vehicle 10, such as a golf car 10. Golf car 10 includes at least one front wheel 12, and a plurality of rear wheels 14 with a tire 16 mounted on front wheel 12 and rear wheels 14. In the exemplary embodiment, golf car 10 includes two front wheels 12 that are controlled by an operator using a steering wheel 18 or other steering device through a mechanical linkage 20 coupled to front wheels 12. Golf car 10 also includes a control system 22 and at least one battery 24 that is electrically connected to control system 22 to facilitate providing electrical energy to drive golf car 10. A switch 26 is electrically coupled to control system 22, and permits power to be supplied from battery 24 to a traction motor 28. A forward/reverse switch 30 can be set to cause vehicle 10 to proceed in either a forward or a reverse direction. Golf car 10 also includes a brake pedal 32 that may be used to actuate an electric brake 33 and an accelerator pedal 34. Accelerator pedal 34 is connected to an accelerator position sensor (not shown) which provides signals to control system 22 to control traction motor 28 by regulating the amount of power supplied from battery 24 to traction motor 28.

In use, a driver (not shown) seated on a seat 36 engages switch 30 to select either a forward or reverse direction of motion for golf car 10. Thereafter, it is desirable to turn key 26 to an "on" position and to depress accelerator 34 to cause golf car 10 to begin moving. Generally, golf cars 10 are set to proceed at a predetermined maximum speed such as, for example, 14.5 miles per hour, with accelerator pedal 34 fully depressed and golf car 10 proceeding on level ground. If golf car 10 encounters a hill, control system 22 senses the increased torque required to maintain the maximum speed and adjusts the power supplied to traction motor 28 to increase both armature current and field current in order to cause traction motor 28 to produce additional torque to facilitate maintaining a maximum allowable speed of golf car 10.

Figure 2:
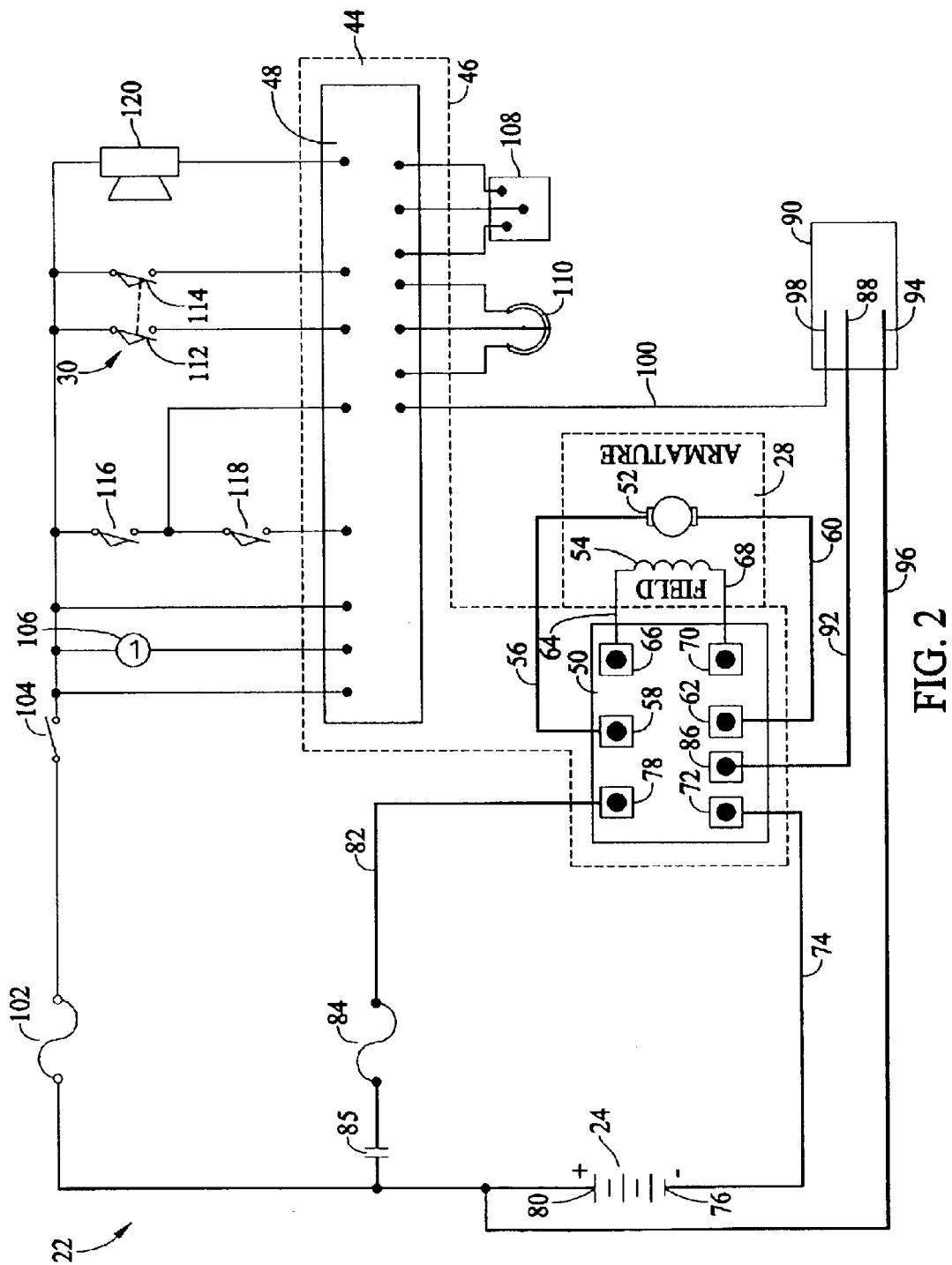
FIG. 2 is schematic diagram of an exemplary control system that may be used with the electric vehicle (shown in FIG. 1)

FIG. 2 is schematic diagram of an exemplary control system 22 that may be used with electric vehicle 10 shown in FIG. 1. In the exemplary embodiment, control system 22 includes an integrated microcontroller-controlled traction motor controller/vehicle battery charge controller system 44 that may be referred to as an On-Board Controller (OBC). OBC 44 is housed in a unitary electrical enclosure 46 and is mounted to electric vehicle 10 in a location with convenient access to battery 24 and motor 28. A microcontroller 48 controls a traction motor controller/vehicle battery charge controller module 50. In the exemplary embodiment, microcontroller 48 is a highly integrated 8-bit FLASH microcontroller, such as a 68HC908MR16 Microcontroller commercially available from Motorola, Inc., Austin, Tex.

Motor 28 includes an armature winding 52 and a field winding 54 that are each separately controlled by module 50. Armature winding 52 is electrically coupled to module 50 through a first armature cable 56 to a terminal 58 and through a second armature cable 60 to a terminal 62. Field winding 54 is electrically coupled to module 50 through a first field cable 64 to a terminal 66 and through a second field cable 68 to a terminal 70. A first battery terminal 72 of module 50 is electrically coupled to battery 24 through a negative battery cable 74 to a negative terminal 76 of battery 24. A second battery terminal 78 of module 50 is electrically coupled to a positive terminal 80 of battery 24 through a positive battery cable 82. In the exemplary embodiment, cable 82 includes an in-line power fuse 84 to limit current flow from battery 24 during an overcurrent condition. In an alternative embodiment, fuse 84 is a resettable circuit breaker. Cable 82 also includes a main line contact 85 for controlling application of battery power to module 50. A charging terminal 86 of module 50 is electrically coupled to a first socket 88 of a charging receptacle 90 through cable 92. A second socket 94 of charging receptacle 90 is electrically coupled to battery terminal 80 through a cable 96. A third socket 98 of receptacle 90 is electrically coupled to microcontroller 48 through a wire 100 and to a power relay of an external power supply (not shown). In the exemplary embodiment, sockets 88, 94, and 98 are equal in length. In an alternative embodiment, socket 98 is of a length that is different than the length of sockets 88 and 94 for interlocking and or/signaling purposes.

Microcontroller 48 receives inputs from a plurality of devices that may be mounted in various locations onboard vehicle 10. The devices may be powered from battery 24 through a protective device 102 and a drive-tow switch 104, which releases vehicle braking to permit towing of vehicle 10. In the exemplary embodiment, device 102 is a fuse. In an alternative embodiment, device 102 is a resettable circuit breaker. Devices that may be electrically coupled to microcontroller 48 include, but are not limited to, a line contactor coil 106, a tachometer 108 for determining motor and/or vehicle speed, an acceleration potentiometer 110 for adjusting a response of motor 28 to inputs from accelerator pedal 34. In the exemplary embodiment, microcontroller 48 receives input from forward/reverse switch 30 that indicates to microcontroller 48 a desired direction of travel of vehicle 10. In an alternative embodiment, switch 30 is two separate switches 112 and 114 that may be mechanically interlocked to prevent both switches 112 and 114 from being closed simultaneously and/or may be electrically monitored by microcontroller 48 to generate an alarm condition when both switches 112 and 114 are closed. Key switch 26 indicates that a user has authority and desires to operate the vehicle. A start switch 118 is mechanically coupled to accelerator pedal 34 to indicate pedal 34 is depressed. A buzzer 120 provides an audible output of conditions that warrant a user's attention, such as but, not limited to vehicle 10 backing up, vehicle 10 rolling while in a standing period, for example, when the vehicle is unattended and/or moving when accelerator pedal 34 is not depressed, motor temperature, current, and speed in excess of predetermined limits, and battery conditions that are off-normal, such as, low voltage.

In operation, during a charging period, a power source (not shown) is electrically coupled to receptacle 90 to supply charging power to battery 24 through module 50. Microcontroller 48 senses the power source connection through the power source connection to socket 98. Microcontroller 48 executes code to control module 50 to charge battery 24 at a predetermined rate and duration based on battery discharge and use since the last charging period. Microcontroller 48 also disables the motor controller functionality of module 50 to prevent motor operation during a charging period. When microcontroller 48 completes execution of the charging code, microcontroller 48 may end the charging period and may sound an audible alert through buzzer 120. Microcontroller 48 senses when the power source is removed through socket 98. Tow switch 104 is normally closed and when key switch is closed by an user, microcontroller 48 controls module 50 to supply battery power to motor 28 based on at least one of inputs to microcontroller 48, a load on motor 28, a speed of vehicle 10, and an operating algorithm that may be stored in microcontroller 48 or may be stored in a memory associated with microcontroller 48.

Module 50 adjusts current flow in field winding 54 and armature winding 52 to optimize a speed versus torque characteristic of motor 28 during motoring, and controls regenerative braking. Plug braking may be used for zero speed detection, alerting an operator that an unattended car is moving, or to accomplish vehicle slow down when changing vehicle direction of travel from forward to reverse. Microcontroller 48 and module 50 may be used to control plug braking. Specifically, motor field winding 54 may be energized in response to a vehicle motion signal, with a voltage of a polarity for generating a field current to cause motor 28 to act as an electric current generator. Current generated by motor armature 52 is circulated through a plugging diode and into motor armature 52 for electrically retarding rotation of motor armature 52 by plug braking. For example, during standing periods, if vehicle 10 begins to roll backward down a hill while field current is still active in the forward direction, a current will be generated directly into the plugging diode. Since the diode is forward biased, it looks like a short circuit in that direction, this will cause motor 28 to act like a brake to a very slow speed.

Figure 3:
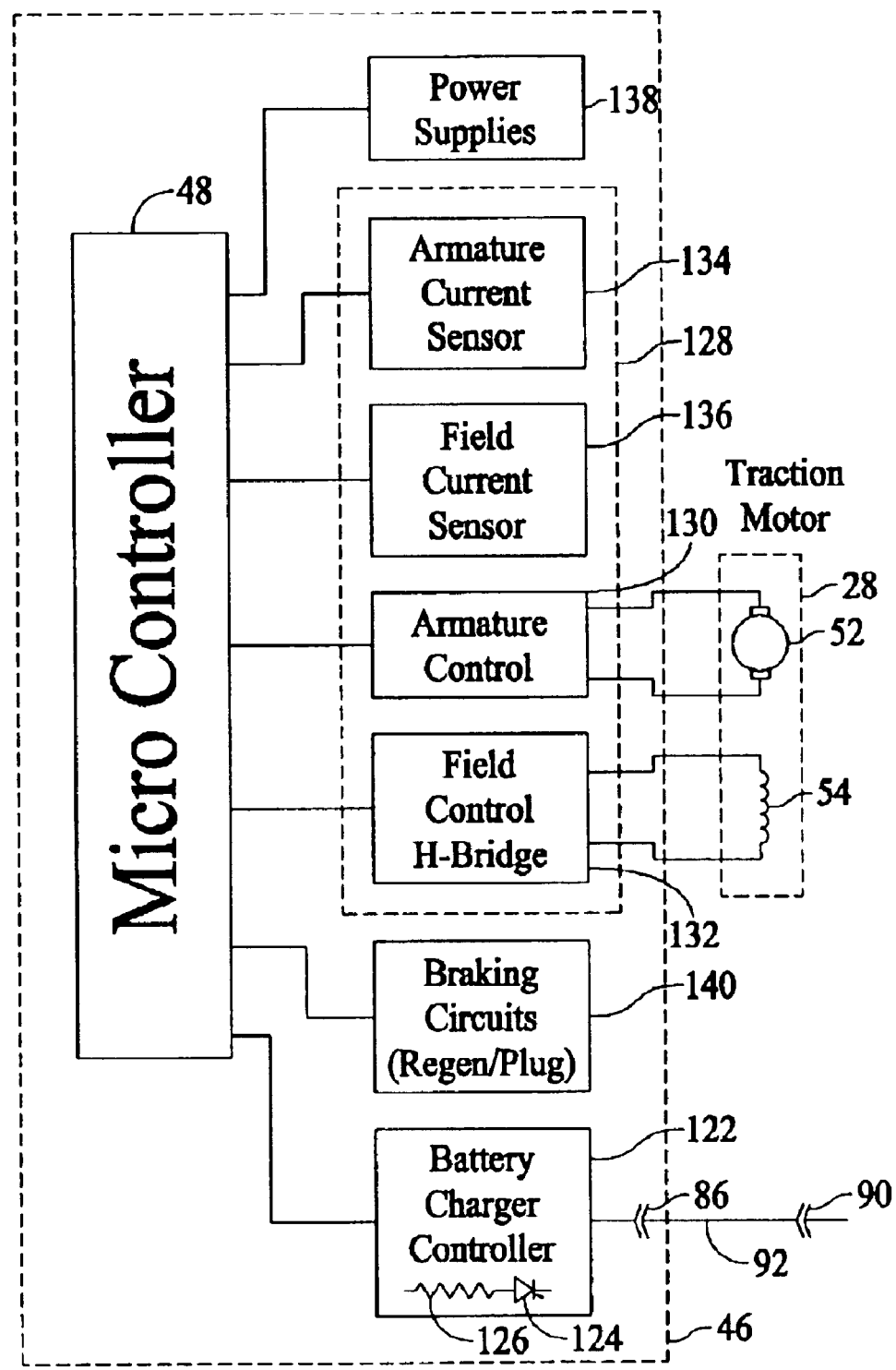
FIG. 3 is a functional block diagram of an exemplary integrated microcontroller-controlled unitary, traction motor controller/vehicle battery charge controller system (shown in FIG. 2).

FIG. 3 is a functional block diagram of an exemplary integrated microcontroller-controlled unitary, traction motor controller/vehicle battery charge controller system 44 shown in FIG. 2. System 44 is a unitary device wherein components used for charging battery 24 and controlling motor 28 are mounted in a single electrical enclosure 46. System 44 is an integrated controller wherein microcontroller 48 selectively controls operation of a battery charge controller section and motor controller section. System 44 includes a battery charge controller 122 that includes a rectifier circuit 124 for controlling charging current entering battery 24 and a current sensor 126 for monitoring current flow into and out of battery 24. In the exemplary embodiment, rectifier circuit 124 includes an SCR circuit controlled by microcontroller 48 to regulate a charging rate of battery 24. System 44 also includes a traction motor controller 128 electrically coupled to battery 24 for separately regulating a current flow to armature winding 52 and field winding 54 of motor 28 during transport periods, which include motoring, standing, and braking periods. Traction motor controller 128 includes a shunt motor controller that includes of a DC chopper control circuit 130 for control of motor armature 52 and a separate H-bridge configuration 132 for controlling motor field 54. A current sensor 134 monitors current flow to armature 52 and a current sensor 136 monitors current flow into field winding 54. Current sensors 126, 134 and 136 may be used by microcontroller 48 to determine a state of charge of battery 24, which may be used to determine a charging rate of battery 24 during a next charging period.

System 44 includes a power supply circuit 138 that supplies regulated power to components of system 44, such as, but not limited to microcontroller 48. A braking circuit 140 includes components used by microcontroller 48 to control regenerative braking and plug braking periods.

The combination of traction motor controller 128 and battery charge controller 122 into one physical package eliminates several redundancies, which improves product cost and improves quality. Redundant microprocessors, power supplies and under voltage circuitry may be eliminated because battery charge controller 122 is not operating when vehicle 10 is motoring and traction motor controller 128 is operating. Similarly, traction motor controller 128 is idle when battery 24 is being recharged. The capabilities of microprocessor 48, power supply 138 and under voltage circuits are more fully utilized in integrated system 44 than if separate battery charger and motor controller were used. Eliminating redundant circuits also eliminates cross connecting wiring and plugs and thus a potential area for defects is reduced and the reliability of system 44 is improved. Utilizing one set of circuitry for both battery charge controller 122 and traction motor controller 128 eliminates a need for the controls to transmit signals between battery charge controller 122 and traction motor controller 128 to prevent charger operation during motoring and motor controller operation during battery charging.

Integrated traction motor controller/vehicle battery charge controller 44 uses current sensors 134 and 136 inherent in the separate traction controller design. Current sensors 134 and 136 are also utilized by battery charge controller 122 to measure the amount of energy consumed by traction motor controller 128. As a result, current sensor 126 used in battery charge controller 122 may be fabricated smaller, and less expensive, as it will only need to measure approximately 10–20 amps of charge current, while the traction controller current sensors 134 and 136 may be used to measure the approximately 200–400 amps of discharge current drawn by the traction motor controller 128.

Combining traction motor controller 128 and battery charge controller 122 into one integrated unit also reduces an inherent parasitic current draw that may be associated with a presence of a plurality of power supplies and a plurality of microprocessors. The combination of traction motor controller 128 and battery charge controller 122 functions into one physical package facilitates reducing tooling and cover costs, as well as facilitating simplifying vehicle 10 assembly and maintenance.

The above-described unitary, integrated on-board control is cost-effective and highly reliable for controlling battery charging, and vehicle motoring and braking in an electric vehicle. Specifically, combining the functionality of a traction motor controller and a battery charger facilitates reducing a number of components used, a number of wires and connections, and facilitates simplifying installation and maintenance. As a result, the methods and apparatus described herein facilitate reducing electric vehicle fabrication and maintenance costs while facilitating vehicle reliability in a cost-effective and reliable manner.

While the invention has been described in terms of various specific embodiments, those skilled in the art will recognize that the invention can be practiced with modification within the spirit and scope of the claims.

What is claimed is:

1. A method of controlling electrical energy in a battery-powered vehicle, the vehicle including a battery and a traction motor, said method comprising:

electrically coupling an external source of electrical energy to a unitary, integrated traction motor controller/vehicle battery charge controller positioned on-board the vehicle;

controlling electrical energy flow to the battery with the unitary, integrated traction motor controller/vehicle battery charge controller during a charging period; and controlling electrical energy flow to the traction motor, that is operable to propel the vehicle, with the unitary, integrated traction motor controller/vehicle battery charge controller during a transport period.

2. A method in accordance with claim 1 wherein electrically coupling an external source of electrical energy to a unitary, integrated traction motor controller/vehicle battery charge controller comprises electrically coupling a source of direct current electrical energy from a battery charger.

3. A method in accordance with claim 2 wherein electrically coupling an external source of electrical energy to a unitary, integrated traction motor controller/vehicle battery charge controller comprises electrically coupling a signal path between the motor controller/vehicle battery charge controller and the battery charger.

4. A method in accordance with claim 1 wherein controlling electrical energy flow to the vehicle battery comprises regulating at least one of a voltage output and a current output of the source of electrical energy using the integrated traction motor controller/vehicle battery charge controller.

5. A method in accordance with claim 4 wherein regulating at least one of a voltage output and a current output of the source of electrical energy comprises regulating at least one of a voltage output and a current output of the source of electrical energy based on at least one of a battery state of charge and a predetermined charging program.

6. A method in accordance with claim 1 further comprising regeneratively braking the vehicle using integrated traction motor controller/vehicle battery charge controller such that electrical energy produced during braking is returned to the battery.

7. A method in accordance with claim 6 wherein regeneratively braking the vehicle comprises controlling an over speed of the vehicle.

8. A method in accordance with claim 6 wherein regeneratively braking the vehicle comprises limiting a top speed of the vehicle to a predetermined level.

9. A method in accordance with claim 1 further comprising:

plug braking the vehicle using the integrated traction motor controller/vehicle battery charge controller for detecting a zero speed condition; and utilizing a plug braking circuit to at least one of alerting an operator that an unattended vehicle is moving, and slowing down the vehicle when changing vehicle direction of travel.

10. A unitary, integrated traction motor controller/vehicle battery charge controller (OBC) for controlling electrical energy flow in a battery-powered electric vehicle, wherein the vehicle includes a traction motor and a battery for supplying electrical energy to said traction motor, said OBC comprising:

a shunt motor controller mounted within an electrical panel;

a battery charge controller mounted within said electrical panel; and a microprocessor operable with said shunt motor controller to control said traction motor during motoring, braking, and standing periods, said microprocessor operable with said battery charge controller to control a battery charging rate during a charging period.

11. An OBC in accordance with claim 10 wherein said traction motor comprises a field winding and an armature winding, said shunt motor controller comprises:

a DC chopper control for control of said motor armature winding; and a H-bridge configuration for controlling said motor field winding electrically coupled to said traction motor field winding.

12. An OBC in accordance with claim 10 wherein said battery charge controller is configured to control a rate of return of energy to said battery based on a state of charge of said battery, said battery charge controller comprises:

a rectifier; and a current measuring device at least one of magnetically coupled, and electrically coupled to a battery-current carrying conductor.

13. An OBC in accordance with claim 12 wherein said rectifier is an SCR.

14. An OBC in accordance with claim 10 further comprising:

a power supply circuit mounted within said electrical panel, said power supply circuit electrically coupled to said shunt motor controller and said battery charge controller; and an under voltage circuit mounted within said electrical panel, said under voltage circuit electrically coupled to said shunt motor controller and said battery charge controller.

15. A battery-operated vehicle comprising:

a traction motor;

a battery for supplying electrical energy to said motor;

a battery charge controller electrically coupled to said battery;

an electrical connector configured to electrically couple to an external battery charger and to at least one of said battery and said battery charge controller during a charging period; and a motor controller electrically coupled to said motor, said motor controller operable to control current flow to said motor;

said battery charge controller and said motor controller are mounted in a single enclosure, said battery charge controller and said motor controller are integrated to be controlled by a single microcontroller mounted within said enclosure.

16. A vehicle in accordance with claim 15 wherein said microcontroller is operable to control said motor controller and disable said battery charge controller, and to control said battery charge controller and disable said motor controller.

17. A vehicle in accordance with claim 15 wherein said battery charge controller comprises a charging current sensor.

18. A vehicle in accordance with claim 15 wherein said motor controller comprises a motor current sensor.

19. A vehicle in accordance with claim 15 wherein said microcontroller is programmed to determine a state of charge of said battery from a battery discharge history of said battery.

20. A vehicle in accordance with claim 19 wherein said microcontroller is programmed to control said battery change controller to optimize a charging rate and duration based on the state of charge of said battery.

* * * * *